United States Patent
Bacom et al.

(10) Patent No.: US 8,532,817 B2
(45) Date of Patent: Sep. 10, 2013

(54) SYSTEM FOR DETERMINING THE LOCATION OF A DATA STORAGE LIBRARY ROBOT AND METHODS OF DETERMINING THE SAME

(75) Inventors: Scott Edward Bacom, Westminster, CO (US); Christopher Bancroft Brooks, Boulder, CO (US); Nicholas Aldo Nespeca, Boulder, CO (US)

(73) Assignee: Spectra Logic Corporation, Boulder, CO (US)

( * ) Notice: Subject to any disclaimer, the term of this patent is extended or adjusted under 35 U.S.C. 154(b) by 305 days.

(21) Appl. No.: 13/008,731

(22) Filed: Jan. 18, 2011

(65) Prior Publication Data

US 2012/0185079 A1 Jul. 19, 2012

(51) Int. Cl.
*G06F 7/00* (2006.01)
*G06F 17/00* (2006.01)

(52) U.S. Cl.
USPC ........... 700/214; 700/245; 700/258; 700/259; 700/253; 700/207; 700/90; 700/218; 901/1

(58) Field of Classification Search
None
See application file for complete search history.

(56) References Cited

U.S. PATENT DOCUMENTS

| | | | |
|---|---|---|---|
| 2004/0210346 A1* | 10/2004 | Lee et al. | 700/245 |
| 2005/0137742 A1* | 6/2005 | Goodman et al. | 700/214 |

* cited by examiner

*Primary Examiner* — Yolanda Jones
(74) *Attorney, Agent, or Firm* — Kenneth Altshuler

(57) ABSTRACT

Systems and methods for determining the location of a mobile robot within a data storage library and to a library including such systems and utilizing such methods.

21 Claims, 5 Drawing Sheets

SYSTEM FOR DETERMINING THE LOCATION OF A DATA STORAGE LIBRARY ROBOT AND METHODS OF DETERMINING THE SAME

CROSS-REFERENCE TO RELATED APPLICATIONS

None.

BACKGROUND OF THE INVENTION

1. Field of the Invention

The present invention relates to data storage libraries that house a plurality of data storage media such as optical discs and magnetic tape cartridges. Such libraries include drives for reading data from the media or writing data onto the media and further include a so-called robot adapted to move the media between their storage locations and the drive. The present invention generally relates to systems and methods for determining the location of a robot within a data storage library.

2. Description of Related Art

Robots in data storage libraries typically move along rails or tracks disposed on a floor of the library. The robotic movement is controlled via communication with a microprocessor that commands the robot to move along the rails or tracks to a particular location adjacent to either to a storage cell in which a disc or cartridge is located or to a drive for reading or writing data from or onto, respectively, the disc or cartridge. The position of the robot along the track is extremely important in connection with proper alignment and registration of the robot with respect to the storage cell or the drive.

If a robot has not been physically moved or jostled from a position known to the microprocessor, then the microprocessor will usually maintain a fairly accurate indication of the location of the robot throughout its travel along the rails or tracks during operation. If the robot is physically moved or jostled, however, the position of the robot may be significantly different from that which was last known to the microprocessor. Such physical movement or jostling may occur, for example, when a robot is serviced or repaired or when other aspects of the data storage library are serviced or repaired that might require the robot to be moved or that might cause an inadvertent movement of the robot. In data storage libraries that have only a single robot, the microprocessor may move the robot in such a way as to reappraise the microcontroller of its new, current location in the library. Prior art systems for such reappraisement include hard stops whereby the robot moves until it physically abuts a wall or other obstruction and can move no farther, movement of the robot to a point where the robot interrupts a light beam passing through the region of robotic travel to a photodiode receptor, and implementation of course servo units that include a registry of lines along the route of robotic travel and which can be sensed and counted by the robot.

The problems associated with knowing the location of a single robot in a data storage library are compounded when more than one robot is utilized in the library. The robots are designed to move extremely quickly along the rails or tracks so as to maximize the efficiency of the library operation. Therefore, movement of one or more of the robots without knowing their locations may result in the robots colliding and causing significant damage to one or more of the robots. The robots are relatively expensive to repair or replace, but more importantly, the library operations may be shut down until such time as a damaged robot can be repaired or replaced.

When a data storage library includes more than one robot, it is extremely important to know the location of each robot before it travels, or at least within a very short distance of any travel. Knowing the location of the robots is of special importance immediately after the library has been accessed for any purpose, such as servicing and maintaining a robot, servicing and maintaining other aspects of the library, or adding, deleting, or rearranging media elements within the library.

SUMMARY OF THE INVENTION

The present invention relates to systems and methods for determining the location of a mobile robot within a data storage library and to a library including such systems and utilizing such methods.

BRIEF DESCRIPTION OF THE DRAWINGS

The present invention will be described with reference to the accompanying drawings, wherein.

DESCRIPTION OF A PREFERRED EMBODIMENT

Figure 1:
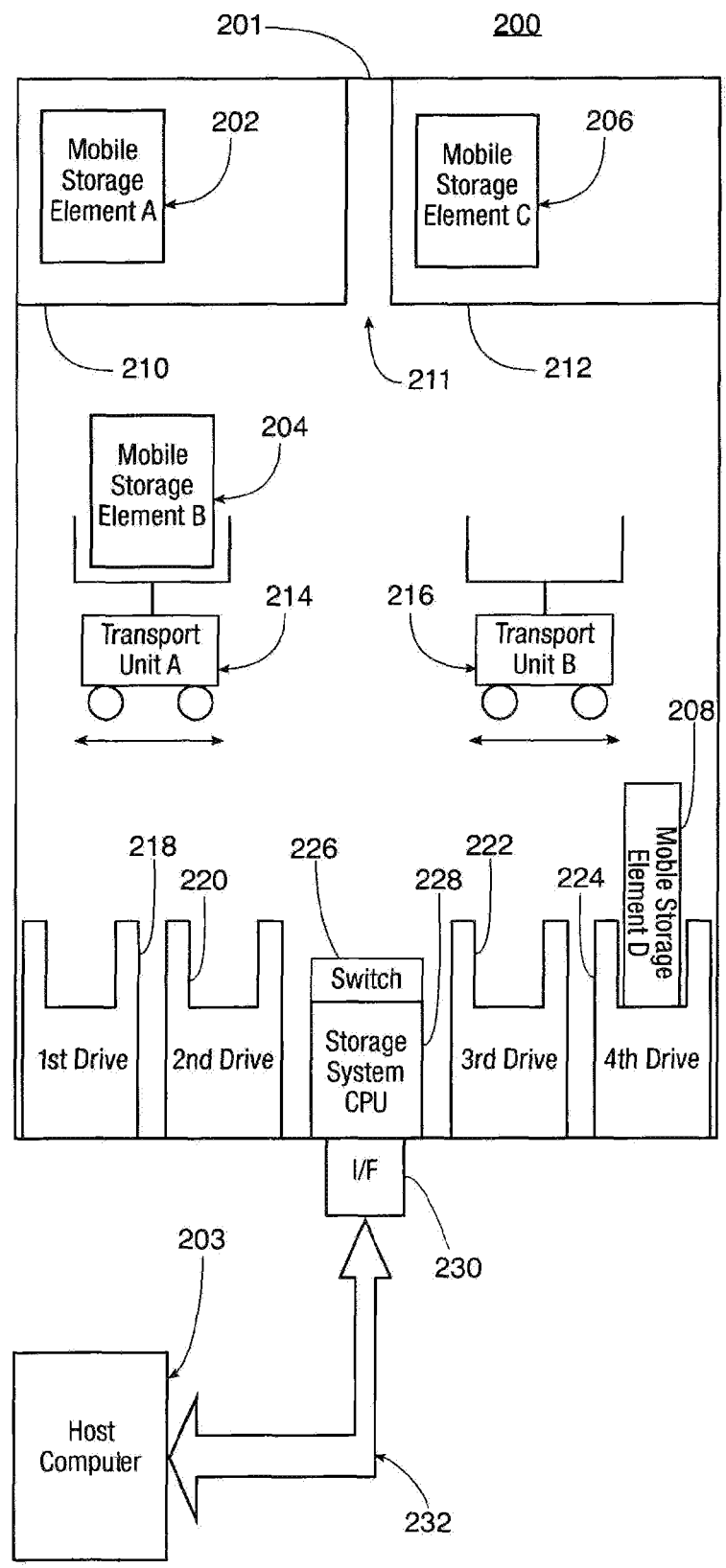
FIG. 1 is a schematic diagram of a data storage library depicting several of the significant components and features thereof.

Preferred embodiments of the present invention will now be described with reference to the accompanying drawings, wherein like reference numerals refer to the same item. The terminology used in the description presented herein is intended to be interpreted in its broadest manner, even though it is being utilized in conjunction with a detailed description of certain specific preferred embodiments of the present invention. It is further emphasized that the following description relates to certain preferred embodiments, and that the invention is directed to and applies to other embodiments that may not be specifically described below.

FIG. 1 shows a diagram of a data storage arrangement 200 with which the present invention may be employed. The present invention may be employed with other arrangements also, and the arrangement shown in FIG. 1 should be considered as only one example of a data storage arrangement in which the present invention may be employed.

The data storage arrangement 200 includes a host computer 203 in communication via path 232 with a storage system 201 via a primary communication interface processor device (I/F) 230 that includes a host port (not shown). The host computer 203 is one exemplary embodiment of a consumer of data; other embodiments can also include a second storage system, similar to storage system 201, or a streaming output device such as a video server, just to name some examples. A consumer of data transmits data or receives data for storage elsewhere, i.e., a consumer of data is generally capable of "taking in" and/or "sending out" data. For example, a host computer 203 is a consumer of data when receiving data (or sending data, such as to the storage system 201), and a storage system 201 is a consumer of data when receiving and sending data to another entity wherein the data is stored. The host computer 203 can be a personal computer, a main frame computer, a server, or any computer system capable of communication with the storage system 201, just to name a few examples. The communication path 232 facilitates communication between the host computer 203 and the storage system 201. The means for communication can be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path 232 can be in the form of a wire line pathway, wireless, or a combination thereof, for example.

The storage system 201, which may also be considered a data storage library by those skilled in the art, is illustratively shown as generally including a shelf system 211, a first robotic transport unit 214 and a second robotic transport unit 216, four removable storage elements 202, 204, 206 and 208, four drives 218, 220, 222 and 224, a switch system 226, a storage system Central Processing Unit (CPU) 228, which employs a macroprocessor as part of the CPU computing device 228, and as I/F 230. As one skilled in the art will recognize, the block diagram of the storage system 201 shows for purposes of simplicity only the primary elements of the exemplary data storage arrangement, and certain necessary structures and components for the aforementioned elements to properly function have been omitted. For example, in practice, the storage system 201 includes all of the necessary wiring, user interface panels, plugs, modular components, entry and exit port(s) to introduce (or remove) removable storage elements into the storage system 201, fault protectors, uninterruptable power supplies, processors, busses, robotic transport unit tracks, indication lights, and so on, in order to function as a data storage library.

In the illustrative arrangement shown in FIG. 1, the shelf system 211 possesses a first shelf 210 and a second shelf 212 each adapted to support the removable storage elements A 202, B 204, C 206, and D 208. The shelf system 211 can possess a single shelf or multiple shelf columns and levels. The shelf system 211 can be located along one side of the storage system 201, as illustratively shown, or optionally in different locations, such as along opposing walls, for example. Furthermore, the shelf system 211 can provide more tailored, accommodating locations adapted specifically to one or more removable storage elements, such as a slot or indentation that matches a removable storage element's footprint. The removable storage element is a storage element that has been adapted for repetitive mobility by a robotic transport unit. The removable storage element can be a disc drive adapted for mobility, a disc drive magazine adapted for mobility, wherein the disc drive magazine comprises a plurality of disc drives, a solid state memory device adapted for mobility, such as a flash memory device, a tape cartridge, a tape magazine comprising a plurality of tape cartridges, an optical disc, a magazine comprising a plurality of optical discs, an independent storage disc, such as a magneto-optical disc or magnetic disc or alternative memory disc used as a storage medium, a magazine comprising a plurality of independent storage discs, or another type of storage device capable of storing data that is adapted for mobility. Further, the removable storage elements are removable from the storage system 201, for example, a tape cartridge, or other mobile storage element, is a removable storage element that can be stored in a location external to the storage system 201 in a vault. Hence, a removable storage element, also called a mobile storage element or a media element herein, is a storage element that is intended to be and capable of being moved and engaged with a drive cyclically and frequently. The drive is adapted to receive and substantially support a removable storage element via an opening in the drive such that, when cooperatively linked, a read and/or write relationship is formed (i.e., data storage operations are facilitated between the drive and the removable storage medium). Some examples of a drive include a disc drive docking station, a tape drive, and a disc drive magazine docking station.

The storage system 201 illustratively shows four drives 218, 220, 222 and 224, however, in optional embodiments, the library may possess more drives or fewer drives. A drive forms a cooperating relationship with a removable storage element such that data can be written to and/or read from the removable storage element. Examples of various drives include a tape drive that is adapted to receive tape cartridges, a disk drive docking station which receives a disk drive adapted for mobility that when paired forms a cooperating read and write relationship, such as a disk drive inside an exterior casing with electrical contacts designed for high cycle contacting, and a disk drive magazine docking station which receives a removable disk drive magazine, as exemplified in U.S. Application No. 2006/0132964 to Lau et al, and a Compact Disk (CD) drive used with a CD.

With continued reference to FIG. 1, the storage system 201 possesses a first robotic transport unit 214 and a second robotic transport unit 216 wherein the first robotic transport unit 214 is illustratively shown transporting magazine B 204 between a drive 218 and the shelf system 212, and a second robotic transport unit 216 that is available for transporting a removable storage element. The term "robot" may be used herein to abbreviate the term "robotic transport unit" without departing from the scope and spirit of the present invention. It should be appreciated that one or any other number of robots may be included in the arrangement. In the exemplary illustrated arrangement, the robots 214, 216 are adapted to move between the first shelf 210 and the second shelf 212 and all of the drives 218, 220, 222 and 224. Though the robots 214, 216 are illustratively shown as block diagrams, an example of a robotic transport unit is that utilized in a commercial storage system such as a T-950 library or a T-Finity library manufactured by Spectra Logic Corp., of Boulder, Colo. The T-950 robotic transport units traverse the T-950 library along a track system and move vertically via an elevator system integrated with each robot transport unit. Furthermore, the T-950 robotic transport units possess an integrated picker system that grasps removable storage elements from a shelf system or from a drive to be moved via the associated robotic transport unit. The integrated picker system further is capable of disposing a removable storage element to the shelf system or to a drive. In the illustrative arrangement, the robot merely provides transportation of the removable storage elements between the shelf system 211 and a drive 218, 220, 222, and 224. The robot may provide the added feature of depositing a removable storage element on the shelf system 212 and/or loading the removable storage element in a cooperating relationship with a drive such that data can be read to and/or written from the removable storage element via the drive. In optional configurations, a loading feature can reside with each drive instead of a picker unit integrated with a robotic transport unit.

It will be appreciated by those skilled in the art that the robots 214, 216 are usually designed to travel along the same tracks or rails within the library. It is also possible to add additional cabinets containing additional shelf systems 211 so that the rails or tracks are extended. Typically, in order to conserve space in which the library situated, the robots 214, 216 travel through a tunnel, corridor, or hallway bounded by the shelf system 211, the drives 218, 220, 222, 224, or the walls of the library. Also, typically, the library includes a ceiling so as to inhibit dust and other debris from entering the library, to confine sound and noise generated by library operation, otherwise to ameliorate library operations.

Figure 2:
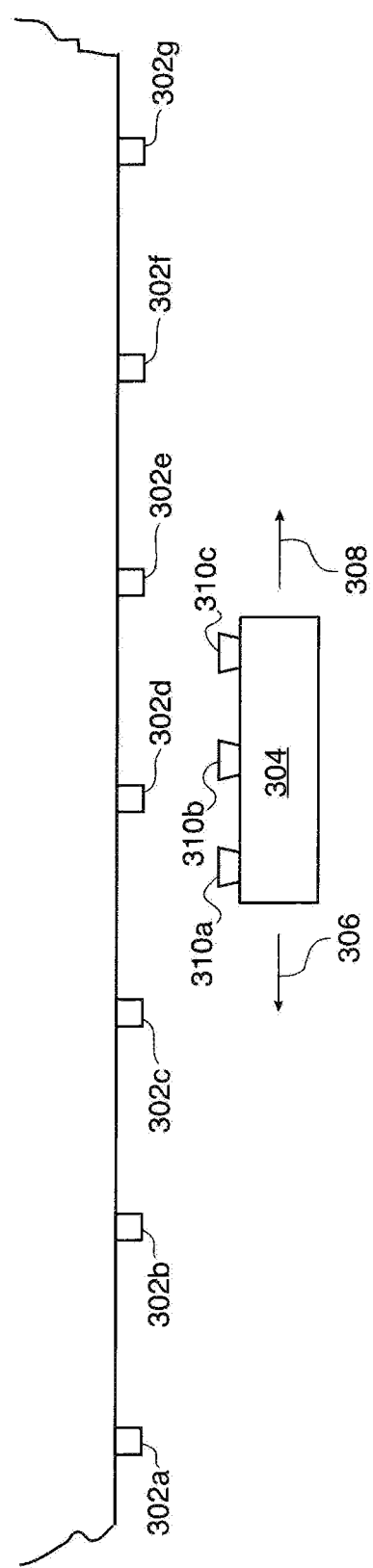
FIG. 2 is a schematic diagram of a system for determining the location of a mobile robot according to one embodiment of the present invention.

In one embodiment of the present invention, the ceiling of the data storage library 201 includes at least one row of lights, such as a row of equally spaced white Light Emitting Diodes (LEDs) 302, as shown in FIG. 2. Although in the embodiment shown in FIG. 2, the row of lights comprises white LEDs 302, aspects of the invention contemplate that LEDs of other colors and wavelength profiles, and that other types of light sources, may be advantageously used. Moreover, to the extent that the ceiling of the data storage library is not already provided with such ceiling light sources, the ceiling may be retrofitted with such light sources.

As shown in FIG. 2, a platform 304 is preferably mounted to and above an associated robot 214, 216 such that the platform 304 is spaced within a few inches or centimeters below the ceiling and the white LEDs 302. For example, preferably the platform 304 is spaced in a range of about one-quarter inch to six inches directly below the LEDs 302, and more preferably about three inches directly beneath the LEDs 302. Because the platform 304 is mounted to one associated robot 214, 216, the platform 304 translates with the associated robot in the directions of the arrows 306, 308 shown in FIG. 2. It should be appreciated that preferably the direction of travel is linear and is coparallel with the (linear) row of LEDs 302. The invention contemplates, however, that the direction of travel of the platform 304 and the associated one of the robots 214, 216 may be other than linear and that the LEDs 302 or other light sources may be arranged in other than a linear row.

In a preferred embodiment shown in FIG. 2, the platform 304 carries on its upper surface three light sensors 310 equally spaced in a (linear) row. Preferably, the row of light sensors 310 is parallel to and disposed vertically beneath the row of LEDs 302 and preferably the direction of travel of the platform 304 and the associated one of the robots 214, 216 is also parallel to and vertically beneath the row of LEDs 302. The light sensors 310 are adapted to sense light emitted from the LEDs 302. The intensity of the light detected will depend on both the square of the distance between the nearest LEDs 302 and the light sensors 310 as well as the sensitivity variations of the light sensors 310 to light impinging thereon at various degrees or angles. The amount or intensity of light sensed by each light sensor 310 may be transmitted wirelessly or otherwise to a microprocessor.

The present invention contemplates that, in the preferred embodiment shown in FIG. 2, the intensity or other characteristics of the light emitted from the LEDs 302 will be modified in a particular sequence, especially a predetermined sequence, which modulations or changes will be detected by each of the light sensors 310. For example, with respect to viewing FIG. 2, the left-most LED 302a may be turned "off", then the next LED 302b to the right of that LED 302a will be turned "off", and so forth toward the right of FIG. 2. A microprocessor may regulate such sequence, and will receive electrical signals from each of the light sensors 310 indicating the magnitude of the light impinging thereon and being sensed. It will be appreciated that when the LED 302c that is third from the left as shown in FIG. 2 is, for example, "off", the left-most light sensor 310a will sense a decrease in light intensity impinging thereon, and when the LED 302d that is fourth from the left in FIG. 2 is turned "off", then both the left-most light sensor 310a and the center light sensor 310b will experience a significant loss of light intensity impinging thereon, and the right-most light sensor 310c will sense a slight decrease in the light impinging thereon. When the LED 302e that is fifth from the left as shown in FIG. 2 is turned "off", then the left-most light sensor 310a will experience only a very slight decrease in light intensity, the center light sensor 310b will experience a moderate decrease in light intensity, and the right-most light sensor 310c will experience a substantial loss in light intensity. By appreciating when each of the LEDs 302 is turned "off" and correlating that sequence with the amount of light intensity sensed by each of the light sensors 310 at the time when each LED 302 is turned "off", the microprocessor may determine the location of the platform 304 relative to particular ones of the LEDs 302, and thereby also the location of the robot.

Through empirical testing of different locations of the platform 304 during a sequence and measuring how each of the light sensors 310 reacts, the microprocessor may be programmed to fairly accurately determine the location of the platform 304 with respect to any particular LED 302 when the sequence is performed. Thus, a relatively accurate determination of the location of the robot along its associated rail or track in the library may be made.

In the preferred embodiment shown in FIG. 2, the spacing between LEDs 302 is about twice as long as the spacing between the light sensors 310. For example, the spacing between the LEDs 302 may be in the range of about one inch to three inches and most preferably about one and six-tenths inches and between the light sensors 310 may be in the range of about one-half and one and one-half inches and most preferably about eight-tenths of an inch. It should be appreciated that the spacing between the three light sensors 310 may be more or less than one-half of the spacing between the LEDs 302, that the number of light sensors 310 may be more or less than three, that the light sensors 310 may be placed in a non-linear array, and that other variations in the configuration of light sensors 310 may be advantageously employed.

It should also be appreciated that instead of turning an LED 302 from "on" to "off", the LED 302 may be turned from "off" to "on" during the sequence or that the LEDs may be flashed "on"/"off" during the sequence. Moreover, the light from the LEDs 302, or other light source, instead of being turned completely "on" or turned completely "off" such as by means of a switch, may be reduced or increased in intensity, such as by means of a rheostat. As a further example of the embodiment shown in FIG. 2, the intensity of the light emitted from the LEDs 302 may be changed from steady to pulsed at a certain frequency. The invention also contemplates that the term "light" may include electro-magnetic radiation outside the visible spectrum of wavelengths.

Figure 3:
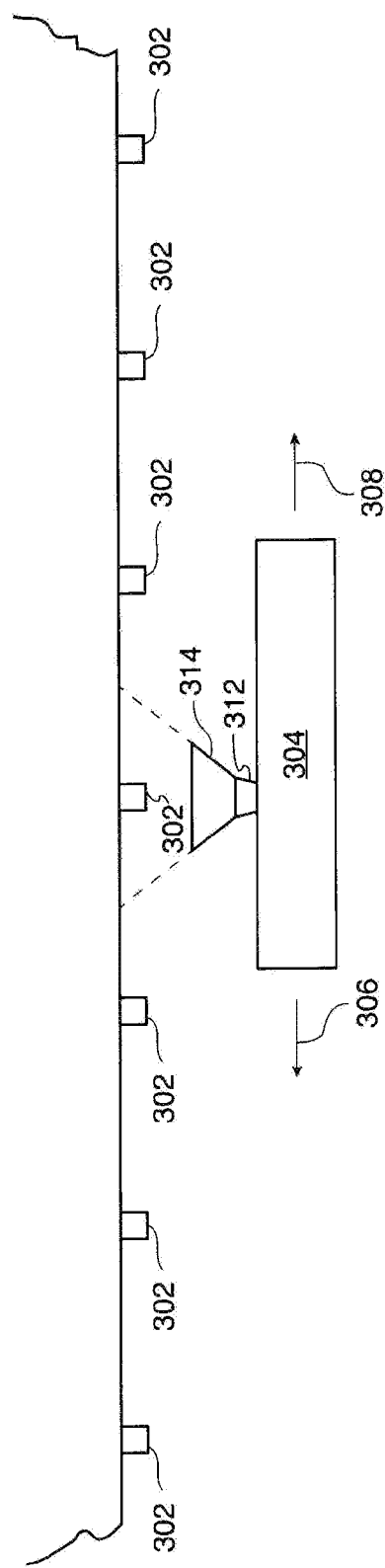
FIG. 3 is a schematic diagram of a system for determining the location of a mobile robot according to another embodiment of the present invention.

Another embodiment of the present invention is depicted in FIG. 3, which includes LEDs 302 and a platform 304 similar in all respects to those described with reference to FIG. 2. A light sensor 312 is carried on the top surface of the platform 304, and a cone-shaped funnel 314 is mounted on top of the light sensor 312. As shown by the dashed lines in FIG. 3, the funnel 314 essentially prevents light originating from outside the angular periphery of the funnel 314 from reaching the light sensor 312. The angular periphery of the funnel 314 may be selectively varied and chosen, preferably such that, no matter where the platform 304 is located, light from essentially only a single LED 302 can be received by the light sensor 312. As shown in FIG. 3 by the dashed lines, the angular periphery of the funnel 314 spans about ninety degrees across, although such angular periphery may be selected so as to extend anywhere in the range of about sixty degrees to one hundred twenty degrees, for example.

Again, through empirical testing, and knowing that the intensity of the light emanating from the LEDs 302 varies according to the square of the distance between an LED 302 and the light sensor 312 and according to the sensitivity of the sensor to light impinging thereon at various angles of inclination, and since the light sensor 312 electrically transmits the intensity of the light impinging thereon to the microprocessor, the microprocessor may closely approximate the location of the platform 304 and the associated robot 214, 216.

The interior surface of the funnel 314 may be either absorbent to light emitted from the LED 302, or may be reflective of such light. Moreover, instead of a cone-shaped funnel 314, the funnel 314 may possess other peripheral curves, slopes, and configurations. Also, more than one funnel 314 and associated light sensor 312 may be carried on the platform 304, in which event, the funnels 314 may have either the same or different angular characteristics and orientations. By modulating the light emitted from the LEDs 302 in a known sequence, the location of the platform 304 and the associated robot 214, 216 may be fairly accurately determined by the microprocessor.

Figure 4:
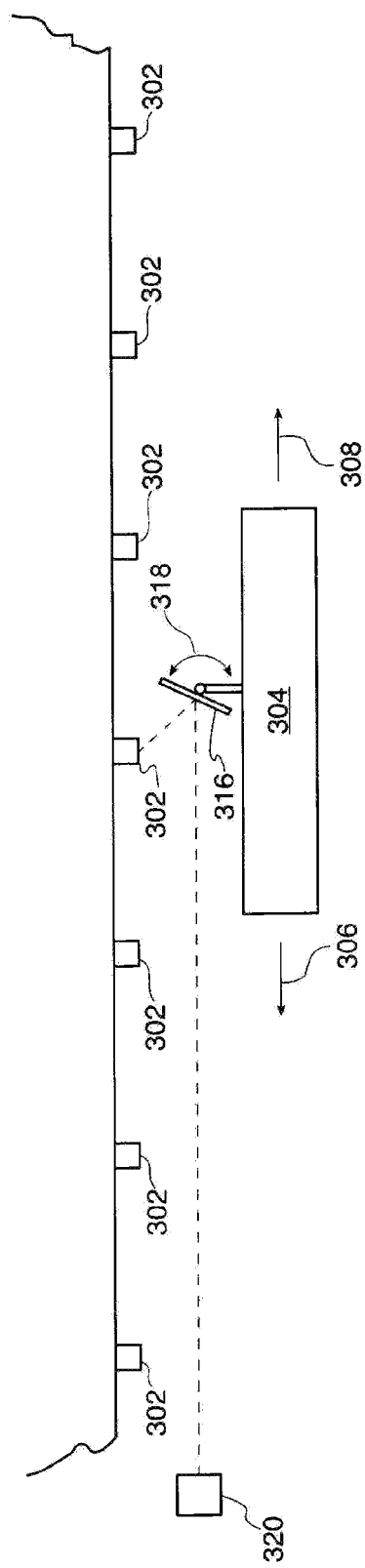
FIG. 4 is a schematic diagram of one embodiment of the system for determining the location of a mobile robot according to yet another embodiment of the present invention.

Yet another embodiment of the present invention is shown in FIG. 4. In this embodiment, the library ceiling includes a row of LEDs 302 and a platform 304 similar in all respects to those described with reference to FIG. 2. A mirror 316 or other reflective surface is carried on the top surface of the platform 304 and is rotatable about an axis in the direction of the arrows 318. A light sensor 320 is preferably disposed at one end of the corridor of travel of the robot 214, 216. The angle of inclination of the mirror 316 is known and may be varied by rotating the minor 316 about its axis under the control of the microprocessor, which also monitors and knows the angle of inclination at any time. By modulating the light emitted from the LEDs 302 in a known sequence, by modifying the angle of inclination of the minor 316, and by sensing the magnitude of the light reflected by the mirror 316 onto the light sensor 320, the location of the platform 304, and thereby the associated robot 214, 216, may be fairly accurately calculated.

Figure 5:
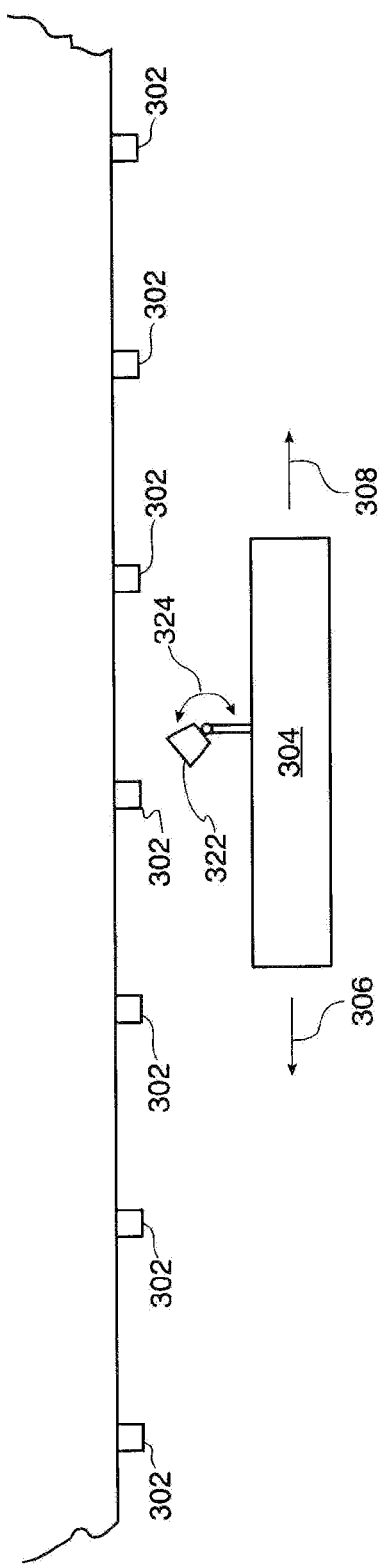
FIG. 5 is a schematic diagram of a system for determining the location of a mobile robot according to a further embodiment of the present invention.

There shown in FIG. 5 yet another embodiment of the present invention utilizing LEDs 302 and a platform 304 similar in all respects to those described with reference to FIG. 2. In this embodiment, a directional light sensor 322 is carried on the top surface of the platform 304 and is rotatable about an axis in the direction of the arrows 324 under the control and monitoring of the microprocessor. The directional light sensor 322 possesses a relatively narrow field of view or reception for receiving light from a light source, such as a field within the range of five degrees to twenty degrees. By modulating the intensity of the LEDs in a known sequence and by rotating the directional light sensor 322, the location of the platform 304, and thereby the associated robot 214, 216, may be fairly accurately calculated.

The present invention also contemplates that instead of utilizing electro-magnetic waves in the form of light, the location of the robot may also be determined by utilizing sound waves or radio waves such as those created, sensed, and analyzed in a SONAR or RADAR system. In this embodiment, a generator sends sound waves or radio waves preferably down the corridor in which the robot 214, 216 is disposed, and the sound waves or radio waves reflect off the body of the robot and are received by one or more sound wave or radio wave receptors. The signals received by the sound wave/radio wave receptors may be analyzed to fairly accurately determine the location of the robot 214, 216.

In yet another embodiment of the present invention, a first determination of the location of the robot 214, 216 may be obtained, and then the robot 214, 216 may be moved under microprocessor control and monitoring a known distance, preferably a relatively short distance such as two inches, along its rail or track, and then another measurement is taken. With such a dual measurement, the location of the robot 214, 216 may be more accurately verified.

The platform 304 has been described in the preferred embodiment as being mounted to and above the robot, however, the platform 304 may be mounted to the robot in many other positions and orientations. Also the sensors and reflectors described as being carried on the platform 304 may be carried directly by the robot without any platform.

The invention also contemplates that instead of the sensors and reflectors being mounted in a stationary, fixed position on the platform 304, the sensors and reflectors may move on the platform, such as sliding on tracks along the top surface of the platform 304 under microprocessor control and monitoring. By moving the sensors or reflectors while the platform 304 and associated robot are stationary in the library, and by sequentially modulating the LEDs 302, an even more accurate determination of the location of the robot can be made through such multiple measurements. The invention also contemplates that instead of moving the sensors and reflectors relative to the platform, the platform itself may move relative to the robot.

It should be appreciated that although the preferred embodiments have been described with reference to light sources mounted on a library ceiling, the light sources may be suspended from a ceiling or suspended without any ceiling. Also, the light sources may be located other than above the robot, and may be located in the library floor, or to the side of the robot.

The invention further contemplates that the light sources or the sensors may be provided with wavelength/band filters so that light intensity and sensor sensitivity may be optimized for better measurements.

While the LEDs or other light sources may have the same intensity and spectral characteristics, the invention further contemplates that the LEDs or other light sources may have different intensity or spectral characteristics that are known to the microprocessor and that may be sensed by the light sensors. As such, the microprocessor will know when a light sensor is near a particular LED or other light source without turning the light source "off" and "on" or otherwise modulating the light from that light source.

It should be appreciated that in the context of the present invention, the location of the robot 214, 216 may be determined by a reverse of the foregoing processes, whereby the light wave, sound wave, or radio wave generators are instead receptors, and the light wave, sound wave, or radio wave receptors are instead emitters.

The various embodiments of the present invention may be employed with the T-Finity library manufactured by Spectra Logic Corporation, of Boulder, Colo. or with a wide variety of other libraries.

While exemplary embodiments have been presented in the foregoing description of the invention, it should be appreciated that a vast number of variations within the scope of the invention may exist including other methods of determining probe insertion positioning. The foregoing examples are not intended to limit the nature or the scope of the invention in any way. Rather, the foregoing detailed description provides those skilled in the art with a foundation for implementing other exemplary embodiments of the invention.

What is claimed is:

1. A method of locating a mobile transport robot in a data storage library comprising:
    (a) providing either (1) at least one electro-magnetic wave source, at least one electro-magnetic wave sensor and an electro-magnetic wave analyzer operatively coupled to said at least one electro-magnetic wave sensor, or (2) at least one sound wave generator, at least one sound wave receptor, and a sound wave analyzer operatively coupled to said at least one sound wave receptor; and
    (b) step for determining the location of said mobile transport robot.

2. A method according to claim 1 wherein step (b) utilizes only said at least one electro-magnetic wave source, said at least one electro-magnetic wave sensor, and said electro-magnetic wave analyzer operatively coupled to said at least one electro-magnetic wave sensor.

3. A method according to claim 1 wherein step (b) utilizes only said at least one sound wave generator, said at least one sound wave receptor, and said sound wave analyzer.

4. A method of claim 1 wherein (1) said electro-magnetic wave source is a light and said data storage library possesses a plurality of said lights positioned in line and evenly spaced apart along an interior top of said data storage library and said electro-magnetic sensor is located at said mobile transport robot, or (2) said library possesses a plurality of sound wave generators positioned in a line and evenly spaced apart along said interior top of said data storage library and said sound wave receptor is located at said mobile transport robot.

5. The method of claim 4 further comprising determining said location of said mobile transport robot when either (1) said electro-magnetic sensor detects one of said plurality of lights that is nearest to said electro-magnetic sensor, or (2) said sound wave receptor detects one of said plurality of sound wave generators that is nearest to said sound wave receptor.

6. A method of locating a mobile transport robot in a data storage library comprising:
    (a) providing a mobile transport robot adapted to move along a pathway in said data storage library, a controller, a plurality of wave generators, and at least one wave sensor; (b) emitting a wave from each of said wave generators either toward or from said mobile transport robot when said mobile transport robot is in a substantially stationary position that impinges on said at least one wave sensor;
    (c) creating an electrical signal indicative of intensity characteristics associated with said waves generated by said plurality of wave generators as sensed by said at least one wave sensor; and
    (d) causing said electric signal to be processed by said controller to indicate the location of said mobile transport robot.

7. A method according to claim 6 further comprising
    (e) moving said mobile transport robot after step (b);
    (f) after step (e), emitting a wave from each of said wave generators either toward or from said mobile transport robot that impinges on said at least one wave sensor;
    (g) after step (f), creating a second electric signal indicative of intensity characteristics associated with said waves generated by said plurality of wave generators in step (f) as sensed by said at least one wave sensor; and
    (h) causing said second electric signal to be processed by said controller to indicate the location of said mobile transport robot.

8. A method according to claim 6 wherein said wave consists essentially of an electro-magnetic wave.

9. A method according to claim 6 wherein said wave consists essentially of a sound wave.

10. The method of claim 6 wherein said wave generators comprise a plurality of lights positioned in a line along the length of a corridor inside of said data storage library and wherein said mobile transport robot travels along said length and said wave sensor is a light sensor linked to said mobile transport robot.

11. A method comprising:
    providing a data storage library that comprises (1) a corridor having a first end and a second end, (2) a rail that runs between said first end and said second end inside said corridor, (3) a plurality of lights disposed along said corridor wherein each of said plurality of lights has a fixed position in said corridor, (4) a robotic transporter operable to move along said rail, (5) a light receiving arrangement disposed on said robotic transporter;
    toggling a first one of said lights on or off, and then toggling a second one of said lights on or off;
    using said light receiving arrangement to sense which of said first light or said second light is closer to said robotic transporter based on said toggling;
    determining the location of said robotic transporter in said corridor based on said sensing of said light receiving arrangement.

12. The method of claim 11 wherein said plurality of lights are spaced in a linear row along said corridor.

13. The method of claim 12 wherein said plurality of lights are equally spaced.

14. The method of claim 12 wherein said plurality of lights are disposed along an interior side of a ceiling of said data storage library.

15. The method of claim 12 wherein said light receiving arrangement comprises three light sensors arranged in a linear row parallel to and disposed vertically beneath said linear row of lights.

16. The method of claim 12 wherein said light receiving arrangement comprises a light sensor with a cone shaped funnel that is arranged to receive essentially only direct light from a single one of said plurality of lights, said light sensor disposed vertically beneath said row of lights.

17. The method of claim 12 wherein said light receiving arrangement comprises a sensor disposed in a location other than said robotic transporter and a mirror that directs light from said linear row of lights to said sensor.

18. The method of claim 11 wherein said determining step is accomplished with a controller.

19. The method of claim 18 wherein when light from said first light impinges with greater intensity than all other lights from said plurality of lights on said light receiving arrangement, and an electrical signal indicative of said greater intensity is generated, which signal is processed by said controller to indicate said location of said robotic transporter.

20. The method of claim 18 wherein each of said plurality of lights has a substantially different spectral characteristic.

21. The method of claim 11 wherein said plurality of lights are toggled off or on one at a time in sequence.

* * * * *